June 24, 1930.  R. H. ROLLER  1,766,456
ROAD CLEANER
Filed Jan. 14, 1928  4 Sheets-Sheet 2
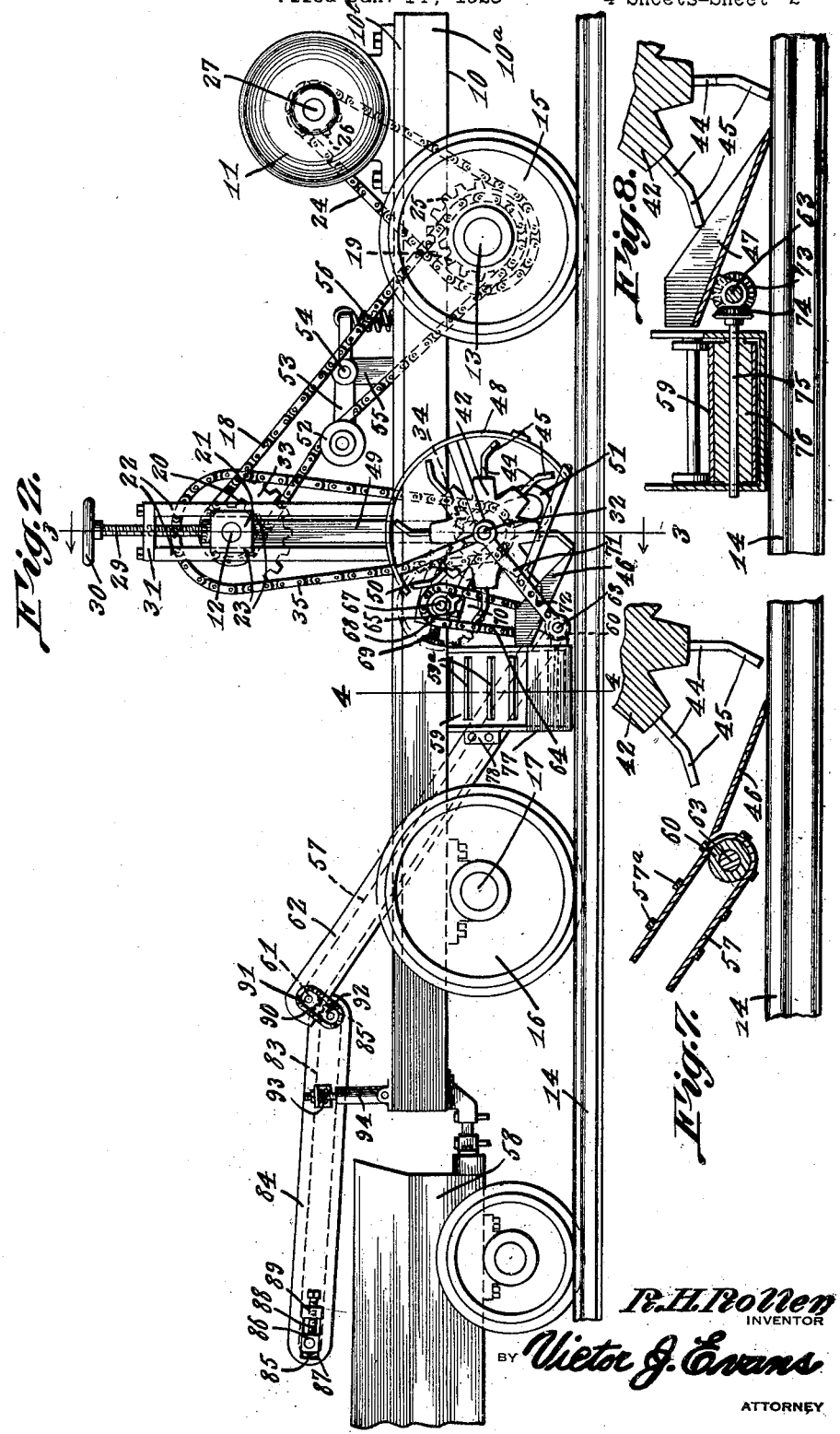

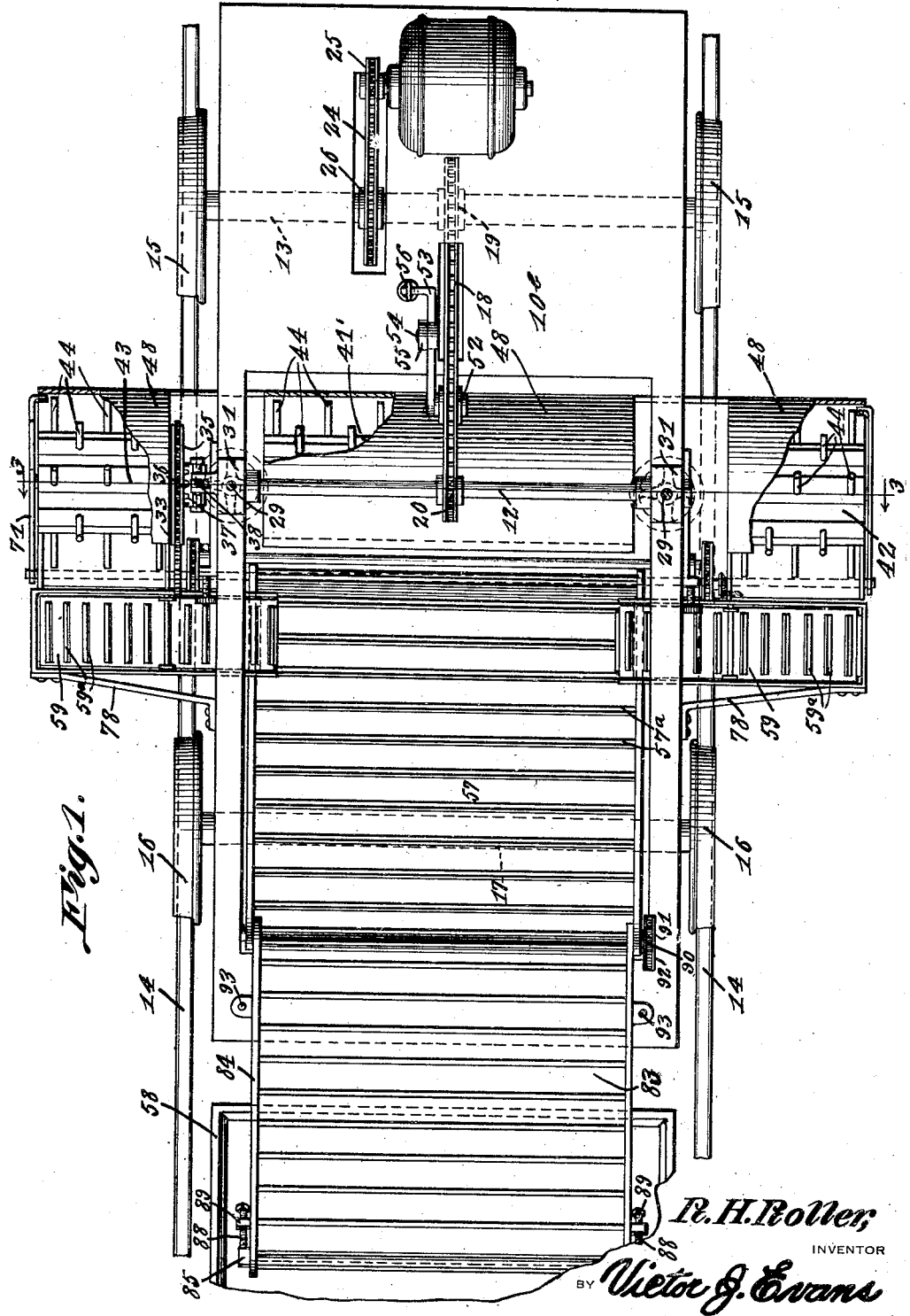

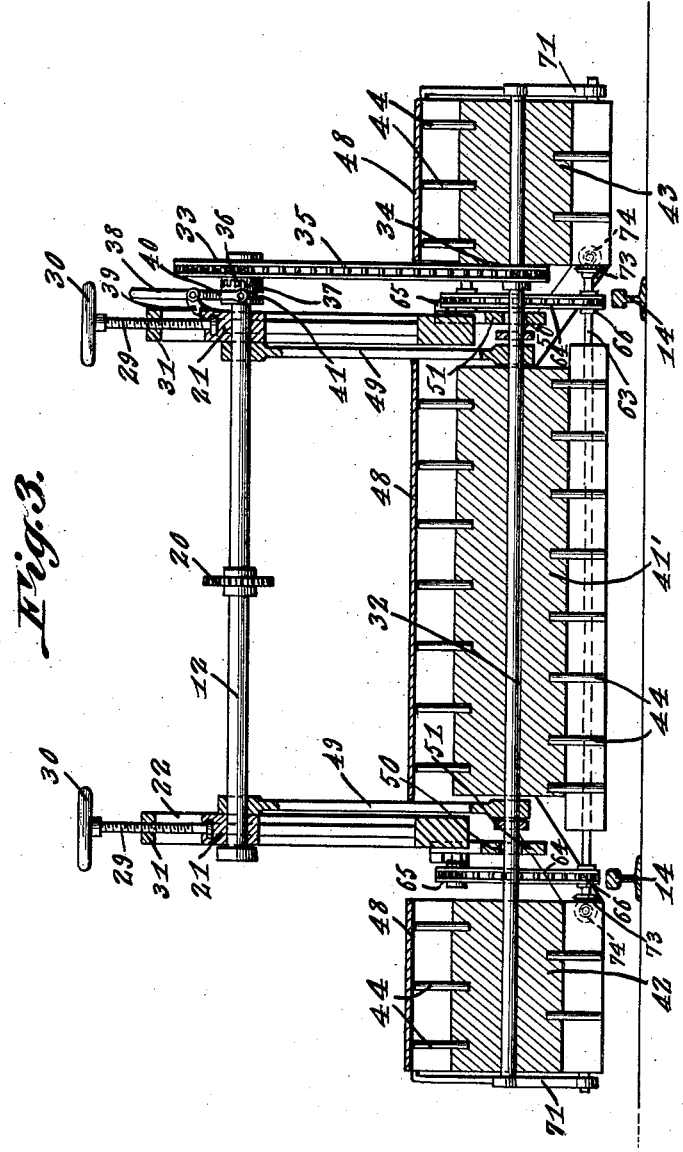

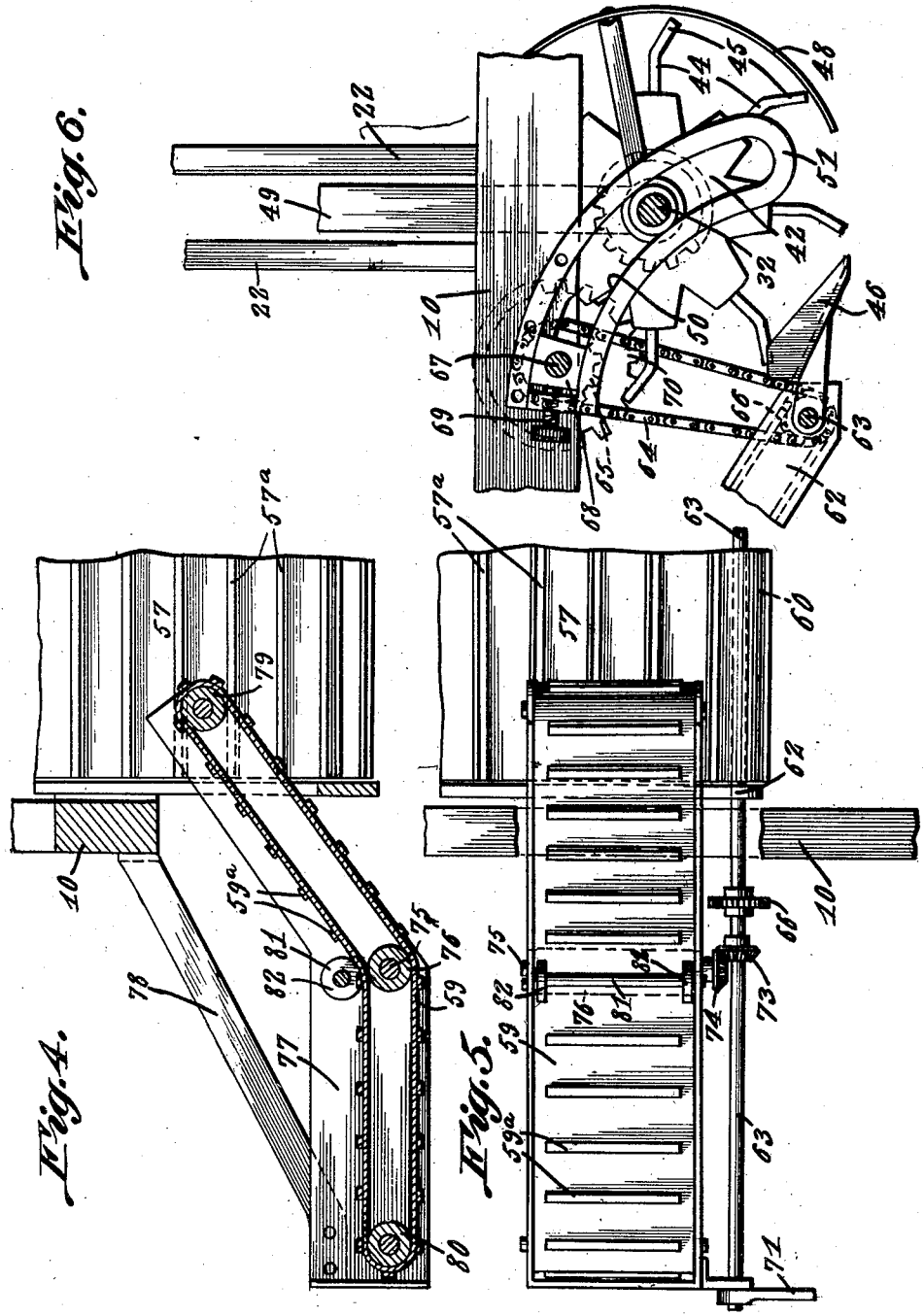

Patented June 24, 1930

1,766,456

UNITED STATES PATENT OFFICE

ROBERT HENRY ROLLER, OF MAMMOTH, WEST VIRGINIA

ROAD CLEANER

Application filed January 14, 1928. Serial No. 246,860.

The present invention relates to road cleaners and is particularly adapted for use in connection with railroads and more specifically to railroads around and in coal mines.

Objects of the invention are to provide a device of the above character which may be used to effectively clean the dirt and coal from between the tracks and on the side of the tracks and to simultaneously load the same into a car as the device moves along the said tracks.

Other objects are to provide for an adjustment of the various parts to adapt them to various conditions and to so construct the device that it will hold up under the heavy usage to which it is applied.

Other objects and advantages will appear from the following specification and will be set forth in the appended claims.

In the drawings:—

Figure 1 is a plan view of a machine constructed in accordance with the principles of my invention.

Figure 2 is a side elevation of the same showing certain parts in section.

Figure 3 is a section on the line 3—3 of Figure 2 showing the adjustability of the cleaning rollers.

Figure 4 is a fragmentary section on line 4—4 of Figure 2 showing one of the endless belts associated with the side rollers.

Figure 5 is a plan view of the endless belt shown in section in Figure 4, the machine shown fragmentarily, said figure illustrating the relation of the side belt to the main endless belt of the machine, said main belt being fragmentarily shown.

Figure 6 is a fragmentary view showing the adjustability of several of the parts of the machine.

Figure 7 is a fragmentary sectional view showing the relation of the roller to the scoop and to the main endless belt.

Figure 8 is a fragmentary sectional view similar to that in Figure 7 showing the relation of one of the rollers to the scoop and belt.

Referring to the drawings in detail by reference numerals, 10 designates the platform of a car which comprises supporting beams $10^a$ and top $10^b$ upon which is mounted the motor 11 in driving connection with the axle 13, the car being movable on tracks 14 by means of wheels 15 on the front axle and wheels 16 on the rear axle 17 of the car. A transverse shaft 12 is provided in driven connection with the axle 13 through the sprocket chain 18 and the sprocket wheels 19 and 20, the shaft being journaled in suitable journal boxes 21 slidably mounted between uprights 22 arranged in pairs at both sides of the platform and spaced apart a distance to receive the journaled boxes 21 therebetween, said journal boxes having sliding connection with the uprights and being held against lateral displacement relative thereto by flanges 23 fitting on either side of the uprights. The driving connection between the motor and the axle comprises a sprocket chain 24 and sprockets 25 and 26 respectively on the power shaft 27 of the motor and the axle 13. The journal boxes 21 are adjustably supported by means of screw shafts 29 having hand wheels 30 at their upper ends and the shafts having threaded connection with cross members 31 secured to the upper ends of the uprights 22. The shaft 12 is in driving connection with a shaft 32 through sprocket wheels 33 and 34 about which is trained the sprocket chain 35, the sprocket wheel 33 being loosely connected with the shaft 12 and being adapted to be rotatably connected therewith by means of the clutch members 36 and 37, the former being on the sprocket 33 and the latter splined to the shaft 12 for slidable movement lengthwise thereof, the clutch 37 being adapted to be moved by the lever 38 pivotally connected to an arm 39 secured to one of the uprights 22 and having a yoke 40 pivoted thereto and riding in a groove 41 in said clutch member 37.

The shaft 32 has mounted thereon for rotation therewith rollers 41', 42 and 43, the roller 41' being adapted to fill substantially the entire space between the rails. The rollers may be spaced from the rails a convenient distance to avoid friction between the ends of the rollers and the rails and against any binding action therebetween.

The rollers are provided with radially extending spikes 44 which may be provided with portions 45 bent at an angle to the portions 44 and forming teeth which are adapted to dig into the coal and move it rearwardly to the scoops 46 and 47. The rollers are preferably of heavy material and are protected by shields 48 of cylindrical formation extending the entire length of the rollers and covering the upper sides thereof, the lower portions of the rollers being exposed and the teeth being adapted to protrude through the open portions of the cylindrical members on the under side thereof.

The shaft 32 is suspended from the shaft 12 by means of links 49 pivotally connected with both the shaft 12 and the shaft 32. The immediate portions of the shaft 32 ride in the arcuate slots 50 of arcuate guide members 51 secured to the car 10, the shaft 32 riding in said slots as the roller is adjusted up and down by means of the screw shafts 29. The chain or belt 18 is maintained taut by means of the idler 52 rotatably mounted on the end of a lever arm 53 pivoted at 54 between its ends to supporting members 55 and maintained in engagement with the sprocket chain 18 by means of a tension spring 56 secured to the end of the lever 53 opposite to that on which the roller 52 is mounted and to a suitable portion of the car.

The platform of the car centrally of its ends is cut away to accommodate the mechanism above described and also to accommodate the endless apron or belt 57 extending upwardly and rearwardly from the scoop or hand 46 which operates between the rollers. This apron or belt 57 is the main conveyor for conveying the coal or dirt to the hopper of the trailer 58 attached to the rear of the car 10. Supplemental conveyor belts in the form of endless aprons 59 are provided extending from the car into position to receive dirt and coal from the side rollers 42 and 43 and to convey the same upward and onto the endless belt 57. The belts 57 and 59 are provided with transverse cleats 57$^a$ and 59$^a$ for well known purposes.

The conveyor 57 is trained about rollers 60 and 61 journaled in the ends of frame members 62, the lower roller 60 being mounted on a shaft 63 which is driven through sprocket chains 64 and pairs of sprockets 65 and 66, the former being secured to a shaft 67 journaled in journal boxes 68 adjustably mounted in the arcuate slot and held in adjusted position by means of the screw shaft 69 in threaded connection with the member 51 at one end of said slot.

Mounted on said shaft 67 is a sprocket 70 adapted to be maintained in driven connection with the sprocket chain 35 by the above named adjustment screw 69. The shaft 32 is pivotally connected with the shaft 63 by means of arms 71 pivotally connected at its end with each of said shafts. The scoop 46 is rigidly connected with said arm by means of bolts or the like shown at 72 whereby when the shaft 32 is adjusted to the screw shaft 29, the member 46 will be likewise adjusted and when the rollers are raised off the ground, the forward end of the scoop 46 will also be lifted from contact with the ground.

The shaft 63 is provided adjacent the sides of the car 10 with beveled gears 73 which are in driving connection with beveled gears 74 on the ends of shafts 75 upon which the rollers 76 of the conveyor 59 are rotatably mounted, the conveyor belt 59 being trained about the roller 76 at the lower end of the supporting structure 77 secured to the frame by brackets 78, the upper end of said belt being trained about suitable rollers 79 and the lower ends over rollers 80. Those portions of the belts between the rollers 76 and 80 are maintained in a horizontal position, the upper side of the belts being held against the roller 80 by means of idling wheels 81 mounted at the ends of shaft 82 which are journaled in the sides of the supporting structure 77.

The endless conveyor 57 extends to a point above a supplemental apron or conveyor 83 mounted in a frame 84 upon rollers 85, one of which is mounted in adjustable journal boxes 86 slidably mounted in slots 87 in the frame 84 and held in adjusted position by the screw bolts 88 threaded through ears 89 mounted on said frame. The belt 83 is revolved upon the rollers 86 by means of a sprocket chain 90 trained about sprocket wheels 91 and 92 respectively on shafts 61 and one of the rollers 86.

In operation, the motor 11 is actuated in any suitable manner which will cause the car 10 to progress along the tracks 14 upon which it is mounted. At the same time, the shaft 12 will be rotated through the chain 18 which will cause the rollers 41', 42 and 43 to rotate through the sprocket chain connection 35, the shaft 63 will at the same time be caused to rotate through the sprocket chain 64, sprocket wheels 65 and 66, the teeth 45 directing the dirt and coal rearwardly upon the scoop members 46 and 47 from thence it will be directed to the endless belts 57 and 59 and conveyed rearwardly by the belt 57 deposited on the belt 83 and from thence will be dumped into the trailer 58, the frame 84 being adjustable as to height above the trailer 58 by means of the threaded shaft 93 threadedly connected with the socket of a socketed member 94 which is secured to the car 10, the endless belts 59 being rotated by means of the shaft 75 geared onto the shaft 63 by means of miter gears 73 and 74. When it is desired to move the car with the cleaning mechanism inoperative, the rollers 41', 42 and 43 may be raised free from contact with the ground by means of the screw shaft 29 as described above.

Having described my invention what I claim is:

1. A machine for cleaning railways comprising a vehicle, means for propelling the vehicle along the railway, rollers on said vehicle and means for rotating the same, an endless belt revolubly mounted and extending from a point adjacent said rollers to the rear of said vehicle, a scoop extending under one of said rollers and adapted to direct material dislodged thereby onto said endless belt, said rollers being provided with teeth extending radially therefrom, and some of the rollers being arranged upon the outer sides of the railway.

2. A machine for cleaning railways comprising a vehicle, rollers adjustably mounted on said vehicle and having radial teeth extending therefrom, an endless belt extending from a point adjacent the ground and in proximity to said rollers, means for rotating said rollers comprising a sprocket chain trained about sprockets and means for revolving said endless belt comprising a sprocket, the teeth of which mesh with said sprocket chain and a pair of sprockets, one for driving said belt and the other connected with the sprocket, the teeth of which mesh with said belt, some of the rollers being disposed upon the outer side of the railway, and auxiliary endless belts operable in conjunction with the endless belt for the outermost of the rollers.

3. A machine for cleaning railway beds comprising a car mounted for locomotion on the rails of said railway, means for driving said car along said rails comprising a motor having a sprocket attached thereto, a sprocket on one axle of said car and a chain trained on said sprockets, rollers adjustably mounted on said car and an endless belt extending rearwardly and upwardly from a point adjacent the lower side of one of said rollers, endless belts extending laterally from the car and being inclined upwardly and inwardly toward the center of the car adjacent the first mentioned endless belt, some of the rollers rotating said belts, and means for directing material from the sides of the track onto said laterally extending belts.

In testimony whereof I affix my signature.

ROBERT HENRY ROLLER.